United States Patent
Lin et al.

(10) Patent No.: US 12,366,730 B2
(45) Date of Patent: Jul. 22, 2025

(54) LENS ASSEMBLY, CAMERA, AND ELECTRONIC DEVICE

(71) Applicant: Huawei Technologies Co., Ltd., Shenzhen (CN)

(72) Inventors: Weichih Lin, Dongguan (CN); Haishui Ye, Shanghai (CN); Hong Ge, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 778 days.

(21) Appl. No.: 17/623,154

(22) PCT Filed: May 11, 2020

(86) PCT No.: PCT/CN2020/089525
§ 371 (c)(1),
(2) Date: Dec. 27, 2021

(87) PCT Pub. No.: WO2021/004148
PCT Pub. Date: Jan. 14, 2021

(65) Prior Publication Data
US 2022/0365322 A1      Nov. 17, 2022

(30) Foreign Application Priority Data

Jul. 11, 2019 (CN) .......................... 201910627999.5
Sep. 30, 2019 (CN) .......................... 201910944877.9

(51) Int. Cl.
G02B 13/00 (2006.01)
G02B 1/04 (2006.01)
G02B 7/02 (2021.01)

(52) U.S. Cl.
CPC ......... *G02B 13/0045* (2013.01); *G02B 1/041* (2013.01); *G02B 7/022* (2013.01)

(58) Field of Classification Search
CPC .... G02B 13/0045; G02B 1/041; G02B 7/022; G02B 7/021; G02B 1/00; G02B 13/18;
(Continued)

(56) References Cited

U.S. PATENT DOCUMENTS

2008/0013322 A1   1/2008 Ohkawa
2012/0206627 A1   8/2012 Reshidko et al.
(Continued)

FOREIGN PATENT DOCUMENTS

CN    1646946 A    7/2005
CN    1797059 A    7/2006
(Continued)

OTHER PUBLICATIONS

Mehchep, "Principles of the Construction of Optical Instruments," Defense Industry Press, 1st edition, total 7 pages, total 7 pages (Jan. 31, 1959). With English Abstract.
(Continued)

*Primary Examiner* — Cara E Rakowski
*Assistant Examiner* — Jennifer A Jones
(74) *Attorney, Agent, or Firm* — Leydig, Voit & Mayer, Ltd.

(57) ABSTRACT

A lens assembly and an electronic device including the same are provided. The lens assembly includes a lens group. A lens that is in the lens group and that is close to an object side has a convex surface, and the convex surface protrudes from a shoulder of a lens tube. A head of the lens assembly may be reduced without affecting a maximum field of view of the lens assembly, so that the head of the lens assembly tends to be miniaturized. Therefore, a size of a hole provided on a display screen is reduced. Thus, a screen-to-body ratio of the display screen is improved.

12 Claims, 16 Drawing Sheets

(58) Field of Classification Search
CPC .......... G02B 7/02; G03B 17/12; G03B 29/00; G03B 11/00; H04N 23/55; H04N 23/57; H04N 23/90; H04M 1/0264; H04M 1/02
See application file for complete search history.

(56) References Cited

U.S. PATENT DOCUMENTS

| | | | |
|---|---|---|---|
| 2012/0314122 | A1 | 12/2012 | Yamashita |
| 2015/0293332 | A1 | 10/2015 | Kondo et al. |
| 2016/0313472 | A1* | 10/2016 | Huang .................. G02B 5/208 |
| 2017/0146777 | A1* | 5/2017 | Dror .................. G02B 27/0025 |
| 2018/0095237 | A1 | 4/2018 | Kanzaki |
| 2018/0149837 | A1 | 5/2018 | Jung |
| 2018/0164532 | A1 | 6/2018 | Wei |
| 2018/0275375 | A1 | 9/2018 | Dror et al. |
| 2018/0329176 | A1* | 11/2018 | Tang .................. G02B 27/0025 |
| 2020/0333562 | A1* | 10/2020 | Lin .................. G02B 13/18 |
| 2020/0348480 | A1* | 11/2020 | Kim .................. G03B 30/00 |
| 2021/0294079 | A1* | 9/2021 | Chen .................. G02B 13/0045 |

FOREIGN PATENT DOCUMENTS

| | | |
|---|---|---|
| CN | 101000383 A | 7/2007 |
| CN | 101109837 A | 1/2008 |
| CN | 100468187 C | 3/2009 |
| CN | 201352268 Y | 11/2009 |
| CN | 102334046 A | 1/2012 |
| CN | 102466865 A | 5/2012 |
| CN | 103477264 A | 12/2013 |
| CN | 103502868 A | 1/2014 |
| CN | 103984081 A | 8/2014 |
| CN | 203838397 U | 9/2014 |
| CN | 104297903 A | 1/2015 |
| CN | 105988192 A | 10/2016 |
| CN | 106405841 A | 2/2017 |
| CN | 106501942 A | 3/2017 |
| CN | 106814441 A | 6/2017 |
| CN | 206339748 U | 7/2017 |
| CN | 206339821 U | 7/2017 |
| CN | 206523665 U | 9/2017 |
| CN | 107544141 A | 1/2018 |
| CN | 108152922 A | 6/2018 |
| CN | 108152930 A | 6/2018 |
| CN | 108152933 A | 6/2018 |
| CN | 108957711 A | 12/2018 |
| CN | 208399783 U | 1/2019 |
| CN | 109541779 A | 3/2019 |
| CN | 109581626 A | 4/2019 |
| CN | 208724047 U | 4/2019 |
| CN | 208795905 U | 4/2019 |
| CN | 109856753 A | 6/2019 |
| CN | 110196478 A | 9/2019 |
| CN | 110261981 A | 9/2019 |
| CN | 110271211 A | 9/2019 |
| CN | 211531155 U | 9/2020 |
| CN | 112596135 A | 4/2021 |
| JP | H09113783 A | 5/1997 |
| JP | 2007310276 A | 11/2007 |
| JP | 2010164960 A | 7/2010 |
| JP | 2014041388 A | 3/2014 |
| JP | 2015072403 A | 4/2015 |
| JP | 2015111310 A | 6/2015 |
| JP | 2018060137 A | 4/2018 |
| KR | 20060102466 A | 9/2006 |
| KR | 100843475 B1 | 7/2008 |
| SU | 1429074 A1 | 10/1988 |
| WO | 2014006822 A1 | 1/2014 |
| WO | 2018126565 A1 | 7/2018 |

OTHER PUBLICATIONS

Huang Yaolin et al., "Design of a 16 mega-pixel mobile phone lens," Optical Instruments, vol. 40, No. 1, Total 5 pages (Feb. 2018). With an English Abstract.

* cited by examiner

LENS ASSEMBLY, CAMERA, AND ELECTRONIC DEVICE

This application is a national stage of International Application No. PCT/CN2020/089525, filed on May 11, 2020, which claims priority to Chinese Patent Application No. 201910627999.5, filed on Jul. 11, 2019, and Chinese Patent Application No. 201910944877.9, filed on Sep. 30, 2019, which are hereby incorporated by reference in their entireties.

TECHNICAL FIELD

Embodiments of this application relate to the field of terminal technologies, and in particular, to a lens assembly, a camera, and an electronic device.

BACKGROUND

A photographing function is an indispensable function for an electronic device (such as a mobile phone or a tablet computer). To obtain good image quality and photographing effects, a plurality of cameras are disposed on the electronic device to provide various photographing functions.

Currently, a photographing apparatus mainly includes a front-facing camera and a rear-facing camera. The front-facing camera is disposed on a surface facing a display screen of the electronic device, and the rear-facing camera is disposed on a surface facing a rear cover of the electronic device. The front-facing camera mainly includes: a lens assembly, a holder base, a light filter, a photosensitive element, and a flexible printed circuit (FPC) board. A structure of the lens assembly is shown in FIG. 1 and FIG. 2. The lens assembly includes a lens tube 1 and the following components that are sequentially arranged in the lens tube 1: a first lens G1, a first light shield M1, a second lens G2, a second light shield M2, a third lens G3, a third light shield M3, a first spacer S11, a fourth light shield M4, a fourth lens G4, a fifth light shield M5, a second spacer S12, a sixth light shield M6, a fifth lens G5, and a clamping ring 2.

Therefore, a head of the lens assembly is relatively large, and a hole on the display screen is relatively large. As a result, a screen-to-body ratio of the display screen is reduced.

SUMMARY

This application provides a lens assembly, a camera, and an electronic device, to reduce a size of a head of the lens assembly. Therefore, a hole provided on a display screen for disposing the camera is reduced, thereby improving a screen-to-body ratio of the display screen. A first aspect of this application provides an electronic device, including a display screen, a middle frame, a rear cover, and at least one camera. The display screen and the rear cover are located on two sides of the middle frame. The camera is disposed on the middle frame. One end of the camera faces the display screen.

The camera includes at least a lens assembly, a holder, a photosensitive element, and a flexible printed circuit. The holder is located between the lens assembly and the flexible printed circuit. The photosensitive element is located at one end that is of the flexible printed circuit and that is opposite to the lens assembly.

A hole is provided on the display screen. One end that is of the lens assembly and that faces an image side extends into the hole.

The lens assembly includes: a lens tube and a lens group disposed in the lens tube. An end that is of the lens tube and that faces an object side has a shoulder. A lens that is in the lens group and that is close to the object side has a convex surface. The convex surface protrudes from the shoulder.

The lens that is in the lens group and that is close to the object side has the convex surface. The convex surface protrudes from the shoulder of the lens tube. In this case, a head of the lens assembly can be reduced without affecting a maximum field of view of the lens assembly, so that the head of the lens assembly tends to be miniaturized, thereby reducing a size of the hole on the display screen and increasing a screen-to-body ratio of the display screen.

In a possible implementation, a maximum distance by which the convex surface protrudes from the shoulder is greater than or equal to 0.3 mm.

In this way, a distance between the convex surface and the display screen is smaller. Therefore, the head of the lens assembly can be further reduced without affecting the maximum field of view of the lens assembly, so that the head of the lens assembly tends to be miniaturized, thereby reducing the size of the hole on the display screen and increasing the screen-to-body ratio of the display screen.

In a possible implementation, the lens that is in the lens group and that is close to the object side includes an effective diameter region and a non-effective diameter region. The non-effective diameter region is provided around an outer edge of the effective diameter region. A surface that is of the effective diameter region and that faces the object side is the convex surface.

A ratio of a center thickness of the effective diameter region to a thickness of the non-effective diameter region is 2.5-3.5.

In this way, it can be ensured that the convex surface that is of the lens in the lens group and that is close to the object side can protrude from the shoulder of the lens tube.

In a possible implementation, a ratio of a diameter of the effective diameter region to the center thickness of the effective diameter region is greater than 3.

In this way, after the center thickness of the effective diameter region of the lens is determined, an effective diameter of the lens can be obtained.

In a possible implementation, a top wall thickness of the lens tube is 0.1 mm-0.25 mm. In this way, the top wall thickness of the lens tube may be reduced to 0.1 mm, the size of the head of the lens assembly may be smaller, and the hole on the display screen may be further reduced.

In a possible implementation, the lens group includes at least a first lens, a second lens, a third lens, a fourth lens, and a fifth lens. The first lens is close to the object side, and the fifth lens is close to the image side. The convex surface is located on a surface that is of the first lens and that faces the object side.

In a possible implementation, the first lens and the fourth lens are plastic lenses whose refractive indexes are greater than 1.6, and the second lens, the third lens, and the fifth lens are plastic lenses whose refractive indexes are less than 1.55.

In this way, a light beam bending capability of the lens group can be improved, and a distance between the surface that is of the lens group and that faces the object side and an imaging surface of the photosensitive element is shortened by 0.2 mm on an optical axis. Therefore, in this embodiment of this application, the distance between the surface that is of the lens group and that faces the object side and the photosensitive element is shortened. In this way, a height of a formed camera is reduced. When the camera is applied to the electronic device, a thickness of the electronic device may be reduced.

In a possible implementation, the first lens is a plastic lens made of a resin material. A melt flow rate of the resin material is greater than 20 g/10 min.

In this way, a modeling filling rate of a lens with a relatively large ratio of a center thickness to an edge thickness can be improved, thereby ensuring optical quality of the lens and increasing imaging definition of a camera with a very small head.

In a possible implementation, the first lens is a glass lens whose refractive index is greater than 1.6, the fourth lens is a plastic lens whose refractive index is greater than 1.6, and the second lens, the third lens, and the fifth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens has a positive focal power, and the fourth lens has a negative focal power.

In this way, the first lens has a light concentration effect, and the fourth lens has a diffusion effect, so that the lens group can be used to shorten an optical path difference. In addition, the light beam refraction capability of the lens group can be improved.

In a possible implementation, dispersion coefficients of the first lens and the fourth lens are less than 30, and dispersion coefficients of the second lens, the third lens, and the fifth lens are greater than 40.

In this way, comprehensive chromatic aberration can be eliminated. Lateral chromatic aberration (LCA) is less than 1 μm, and longitudinal chromatic aberration (LoCA) is less than 5 μm.

In a possible implementation, the lens group includes at least a first lens, a second lens, a third lens, a fourth lens, a fifth lens, and a sixth lens. The first lens is close to the object side, and the sixth lens is close to the image side. The convex surface is located on a surface that is of the first lens and that faces the object side.

In a possible implementation, the first lens, the third lens, and the fifth lens are plastic lenses whose refractive indexes are greater than 1.6, and the second lens, the fourth lens, and the sixth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens is a glass lens whose refractive index is greater than 1.6, the third lens and the fifth lens are plastic lenses whose refractive indexes are greater than 1.6, and the second lens, the fourth lens, and the sixth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens has a positive focal power, the third lens has a negative focal power, and the fifth lens has a positive focal power.

In this way, the first lens has a light concentration effect, the third lens has a diffusion effect, and the fifth lens has a light concentration effect, so that the lens group can be used to shorten an optical path difference. In addition, the light beam refraction capability of the lens group can be improved.

In a possible implementation, dispersion coefficients of the first lens, the third lens, and the fifth lens are less than 30, and dispersion coefficients of the second lens, the fourth lens, and the sixth lens are greater than 40.

In this way, comprehensive chromatic aberration can be eliminated. Lateral chromatic aberration (LCA) is less than 1 μm, and longitudinal chromatic aberration (LoCA) is less than 5 μm.

In a possible implementation, the lens further includes a protection structure. The protection structure is disposed on the shoulder. One end of the protection structure extends to one end that is of the convex surface and that is close to the shoulder.

The protection structure may be used to protect an outer edge of the convex surface of the lens. In addition, the protection structure may implement blackening (for example, coating, in black, an inner side surface of the protection structure and a side surface facing the display screen), delustering, or sandblasting processing to block stray light. The protection structure may also be used to decorate the shoulder of the lens tube, so that the shoulder of the lens tube is darker in appearance.

In a possible implementation, the display screen includes a transparent protection cover and a display module. The hole is provided in a position that is on the display module and that corresponds to the lens assembly.

In a possible implementation, the display module is an OLED display module, or the display module is a liquid crystal display module.

The liquid crystal display module includes a liquid crystal panel and a backlight element. The liquid crystal panel is located between the transparent protection cover and the backlight element. The hole is provided on the backlight element, or the holes are correspondingly provided on both the backlight element and the liquid crystal panel.

A second aspect of an embodiment of this application provides a lens assembly, including a lens tube and a lens group disposed in the lens tube. An end that is of the lens tube and that faces an object side has a shoulder.

A lens that is in the lens group and that is close to the object side has a convex surface. The convex surface protrudes from the shoulder.

The lens that is in the lens group and that is close to the object side has the convex surface. The convex surface protrudes from the shoulder of the lens tube. In this case, a head of the lens assembly can be reduced without affecting a maximum field of view of the lens assembly, so that the head of the lens assembly tends to be miniaturized, thereby reducing a size of a hole on a display screen and increasing a screen-to-body ratio of the display screen.

In a possible implementation, a maximum distance by which the convex surface protrudes from the shoulder is greater than or equal to 0.3 mm.

In this way, a distance between the convex surface and the display screen is smaller. Therefore, the head of the lens assembly can be further reduced without affecting the maximum field of view of the lens assembly, so that the head of the lens assembly tends to be miniaturized, thereby reducing the size of the hole on the display screen and increasing the screen-to-body ratio of the display screen.

In a possible implementation, the lens that is in the lens group and that is close to the object side includes an effective diameter region and a non-effective diameter region. The non-effective diameter region is provided around an outer edge of the effective diameter region. A surface that is of the effective diameter region and that faces the object side is the convex surface.

A ratio of a center thickness of the effective diameter region to a thickness of the non-effective diameter region is 2.5-3.5.

In this way, it can be ensured that the convex surface that is of the lens in the lens group and that is close to the object side can protrude from the shoulder of the lens tube.

In a possible implementation, a ratio of a diameter of the effective diameter region to the center thickness of the effective diameter region is greater than 3.

In this way, after the center thickness of the effective diameter region of the lens is determined, an effective diameter of the lens can be obtained.

In a possible implementation, a top wall thickness of the lens tube is 0.1 mm-0.25 mm.

In this way, the top wall thickness of the lens tube may be reduced to 0.1 mm, the size of the head of the lens assembly may be smaller, and the hole on the display screen may be further reduced.

In a possible implementation, the lens group includes at least a first lens, a second lens, a third lens, a fourth lens, and a fifth lens. The first lens is close to the object side, and the fifth lens is close to an image side. The convex surface is located on a surface that is of the first lens and that faces the object side.

In a possible implementation, the first lens and the fourth lens are plastic lenses whose refractive indexes are greater than 1.6, and the second lens, the third lens, and the fifth lens are plastic lenses whose refractive indexes are less than 1.55.

In this way, a light beam bending capability of the lens group can be improved, and a distance between the surface that is of the lens group and that faces the object side and an imaging surface of a photosensitive element is shortened by 0.2 mm on an optical axis. Therefore, in this embodiment of this application, the distance between the surface that is of the lens group and that faces the object side and the photosensitive element is shortened. In this way, a height of a formed camera is reduced. When the camera is applied to an electronic device, a thickness of the electronic device may be reduced.

In a possible implementation, the first lens is a plastic lens made of a resin material. A melt flow rate of the resin material is greater than 20 g/10 min.

In this way, a modeling filling rate of a lens with a relatively large ratio of a center thickness to an edge thickness can be improved, thereby ensuring optical quality of the lens and increasing imaging definition of a camera with a very small head.

In a possible implementation, the first lens is a glass lens whose refractive index is greater than 1.6, the fourth lens is a plastic lens whose refractive index is greater than 1.6, and the second lens, the third lens, and the fourth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens has a positive focal power, and the fourth lens has a negative focal power.

In this way, the first lens has a light concentration effect, and the fourth lens has a diffusion effect, so that the lens group can be used to shorten an optical path difference. In addition, the light beam refraction capability of the lens group can be improved.

In a possible implementation, dispersion coefficients of the first lens and the fourth lens are less than 30, and dispersion coefficients of the second lens, the third lens, and the fifth lens are greater than 40.

In this way, comprehensive chromatic aberration can be eliminated. Lateral chromatic aberration (LCA) is less than 1 μm, and longitudinal chromatic aberration (LoCA) is less than 5 μm.

In a possible implementation, the lens group includes at least a first lens, a second lens, a third lens, a fourth lens, a fifth lens, and a sixth lens. The first lens is close to the object side, and the sixth lens is close to the image side. The convex surface is located on the surface that is of the first lens and that faces the object side.

In a possible implementation, the first lens, the third lens, and the fifth lens are plastic lenses whose refractive indexes are greater than 1.6, and the second lens, the fourth lens, and the sixth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens is a glass lens whose refractive index is greater than 1.6, the third lens and the fifth lens are plastic lenses whose refractive indexes are greater than 1.6, and the second lens, the fourth lens, and the sixth lens are plastic lenses whose refractive indexes are less than 1.55.

In this way, the light beam bending capability of the lens group can be improved, and the distance between the surface that is of the lens group and that faces the object side and the imaging surface of the photosensitive element is shortened by 0.2 mm on the optical axis. Therefore, in this embodiment of this application, the distance between the surface that is of the lens group and that faces the object side and the photosensitive element is shortened. In this way, the height of the formed camera is reduced. When the camera is applied to the electronic device, the thickness of the electronic device may be reduced.

In a possible implementation, the first lens has a positive focal power, the third lens has a negative focal power, and the fifth lens has a positive focal power.

In this way, the first lens has a light concentration effect, the third lens has a diffusion effect, and the fifth lens has a light concentration effect, so that the lens group can be used to shorten an optical path difference. In addition, the light beam refraction capability of the lens group can be improved.

In a possible implementation, dispersion coefficients of the first lens, the third lens, and the fifth lens are less than 30, and dispersion coefficients of the second lens, the fourth lens, and the sixth lens are greater than 40.

In this way, comprehensive chromatic aberration can be eliminated. Lateral chromatic aberration (LCA) is less than 1 μm, and longitudinal chromatic aberration (LoCA) is less than 5 μm.

In a possible implementation, the lens further includes a protection structure. The protection structure is disposed on the shoulder. One end of the protection structure extends to one end that is of the convex surface and that is close to the shoulder.

The protection structure may be used to protect an outer edge of the convex surface of the lens. In addition, the protection structure may implement blackening (for example, coating, in black, an inner side surface of the protection structure and a side surface facing the display screen), delustering, or sandblasting processing to block stray light. The protection structure may also be used to decorate the shoulder of the lens tube, so that the shoulder of the lens tube is darker in appearance.

A third aspect of an embodiment of this application provides a camera. The camera includes at least the lens assembly according to any one of the foregoing aspects, a holder, a photosensitive element, and a flexible printed circuit. The holder is located between the lens assembly and the flexible printed circuit. The photosensitive element is located at one end that is of the flexible printed circuit and that is opposite to the lens assembly.

The camera includes the lens assembly. Therefore, in the lens assembly, the lens that is in the lens group and that is close to the object side has the convex surface. The convex surface protrudes from the shoulder of the lens tube. In this case, a head of the lens assembly can be reduced without affecting a maximum field of view of the lens assembly, so that the head of the lens assembly tends to be miniaturized, thereby reducing a size of a hole on a display screen and increasing a screen-to-body ratio of the display screen.

In a possible implementation, the camera is a front-facing camera, or the camera is a rear-facing camera.

In this way, when the camera is used as a front-facing camera, a size of a hole provided on the display screen for disposing the lens assembly can be reduced; when the camera is a rear-facing camera, a size of a head of the lens assembly is reduced, so that a hole provided on a rear cover for disposing the rear-facing camera is reduced. Therefore, the rear cover has a more elegant appearance, and the rear cover has better strength.

EXPLANATION OF REFERENCE NUMERALS

100: mobile phone; 10: display screen; 11: hole; 12: transparent protection cover; 13: display module; 131: backlight element;

132: liquid crystal panel; 14: protection structure; 20: front-facing camera; 21: lens assembly; 21a: head; 21b: bottom;

210: lens tube; 2101: shoulder; 2102: top; 2103: first support part; 2104: hole; 211: first lens;

211a: convex surface; 2111: effective diameter region; 2112: non-effective diameter region; 212: second lens; 213: third lens;

214: fourth lens; 215: fifth lens; 216: sixth lens; 22: light filter; 23: holder; 24: photosensitive element;

25: flexible printed circuit; 26: connector; 30: middle frame; 31: frame; 32: middle metal plate; 40: circuit board; 50: battery;

60: rear cover.

DESCRIPTION OF EMBODIMENTS

Terms used in implementations of this application are merely used to explain specific embodiments of this application, but are not intended to limit this application. The following describes the implementations of the embodiments of this application in detail with reference to the accompanying drawings.

An electronic device provided in the embodiments of this application may include but is not limited to a mobile or fixed terminal having a photographing function such as a mobile phone, a tablet computer, a notebook computer, an ultra-mobile personal computer (ultra-mobile personal computer, UMPC), a handheld computer, an intercommunication telephone set, a netbook, a POS machine, a personal digital assistant (PDA), an event data recorder, or a security device.

Figure 2:
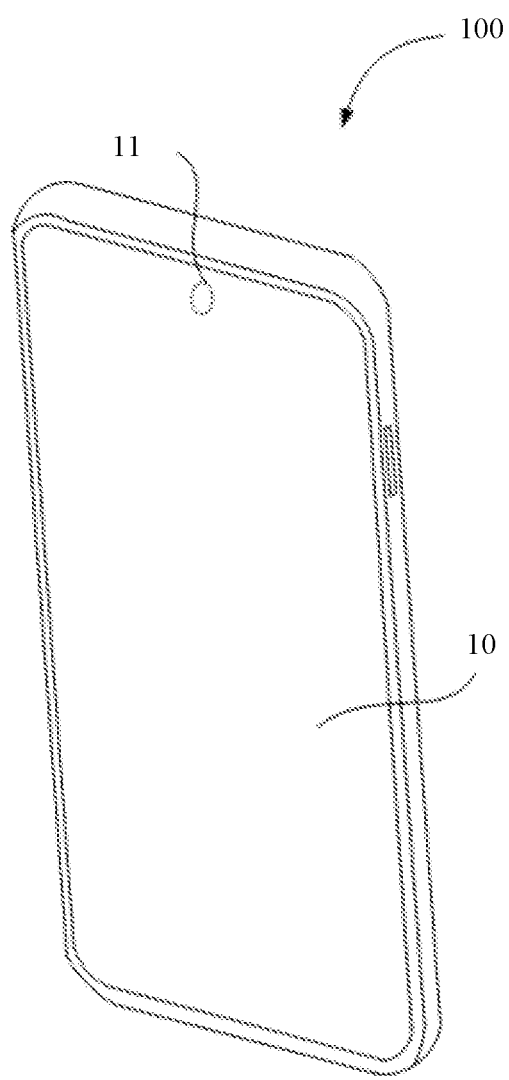
FIG. 2 is a schematic structural diagram of an electronic device according to an embodiment of this application.
Figure 3:
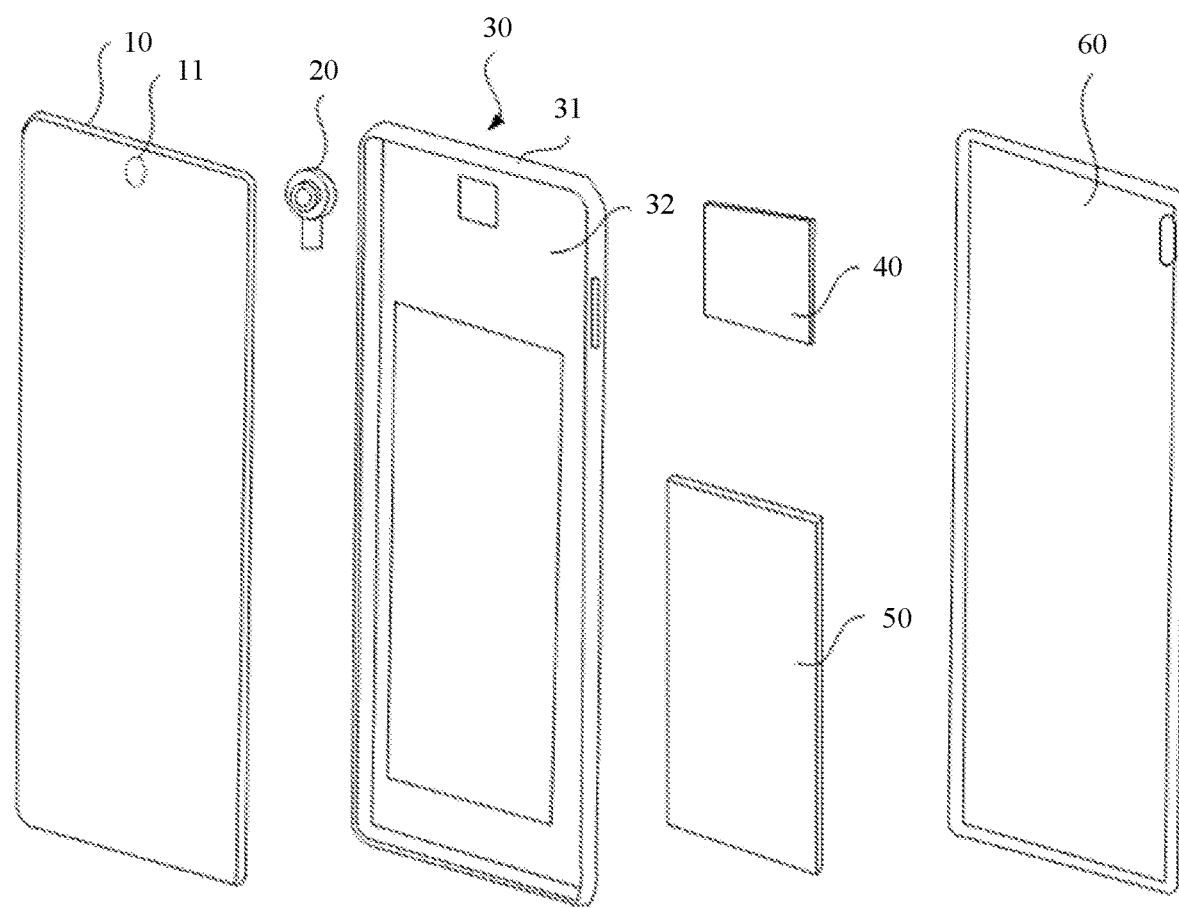
FIG. 3 is a schematic exploded structural diagram of an electronic device according to an embodiment of this application.

In an embodiment of this application, an example in which the foregoing electronic device is the mobile phone is used for description. FIG. 2 and FIG. 3 respectively show an overall structure and a split structure of a mobile phone. Referring to FIG. 2, a display screen of a mobile phone 100 provided in this embodiment of this application may be a water drop screen, a notch screen, or a hole digging screen. The following is described by using the hole digging screen as an example. Referring to FIG. 3, the mobile phone 100 may include a display screen 10 and a rear cover 60. A middle frame 30, a circuit board 40, and a battery 50 may be disposed between the display screen 10 and the rear cover 60. The circuit board 40 and the battery 50 may be disposed on the middle frame 30. For example, the circuit board 40 and the battery 50 are disposed on a surface that is of the middle frame 30 and that faces the rear cover 60, or the circuit board 40 and the battery 50 may be disposed on a surface that is of the middle frame 30 and that faces the display screen 10.

The battery 50 may be connected to a charging management module and the circuit board 40 by using a power management module. The power management module receives input of the battery 50 and/or the charging management module, and supplies power to a processor, an internal memory, an external memory, the display screen 10, a camera, a communications module, and the like. The power management module may be further configured to monitor parameters such as a capacity of the battery 50, a cycle count of the battery 50, and a state of health (electric leakage and impedance) of the battery 50. In some other embodiments, the power management module may be alternatively disposed in the processor of the circuit board 40. In some other embodiments, the power management module and the charging management module may be alternatively disposed in a same component.

The display screen 10 may be an organic light-emitting diode (OLED) display, or may be a liquid crystal display (LCD).

The rear cover 60 may be a rear metal cover, or may be a rear glass cover, or may be a rear plastic cover, or may be a rear ceramic cover. A material of the rear cover 60 is not limited in this embodiment of this application.

The middle frame 30 may include a middle metal plate 32 and a frame 31. The frame 31 is disposed around a periphery of the middle metal plate 32. Generally, the frame 31 may include a top border, a bottom border, a left border, and a right border. The top border, the bottom border, the left border, and the right border form the frame 31 with a square ring structure. The middle metal plate 32 may be an aluminum plate, or may be an aluminum alloy, or may be a magnesium alloy. The frame 31 may be a metal frame, or may be a ceramic frame. The middle metal frame 30 and the frame 31 may be clamped, welded, glued, or integrally formed; or the middle metal frame 30 and the frame 31 are fixedly connected through injection molding.

It should be noted that, in some examples, the rear cover 60 of the mobile phone 100 may be connected to the frame 31 to form an integrally formed or unibody rear cover. For example, the mobile phone 100 may include the display screen 10, the middle metal plate 32, and a battery cover. The battery cover may be a rear cover integrally formed by using the frame 31 and the rear cover 60. In this way, the circuit board 40 and the battery 50 are located in space enclosed by the middle metal frame 30 and the battery cover.

To implement a photographing function, the mobile phone 100 may further include the camera and a flash (not shown). The camera may include a front-facing camera and a rear-facing camera (not shown). The rear-facing camera and the flash may be disposed on a surface that is of the middle metal plate 32 and that faces the rear cover 60, and mounting holes that can be used to mount the flash and the rear-facing camera are provided on the rear cover 60. The front-facing camera may be disposed on a surface that is of the middle metal plate 32 and that faces the display screen 10. In this embodiment of this application, disposing positions of the front-facing camera and the rear-facing camera include but are not limited to the foregoing description. In some embodiments, one or N front-facing cameras and one or N rear-facing cameras may be disposed in the mobile phone 100. Herein, N is a positive integer greater than 1.

It may be understood that the schematic structure in this embodiment of this application constitutes no specific limitation on the mobile phone 100. In some other embodiments of this application, the mobile phone 100 may include more or fewer components than those shown in the figure; or in the mobile phone 100, some components may be combined, or some components may be split, or components are arranged in different manners. The components shown in the figure may be implemented by using hardware, software, or a combination of software and hardware.

Based on the foregoing description, in this embodiment of this application, a scenario in which the front-facing camera 20 is disposed in the mobile phone 100 is used as an example for description.

Scenario 1

Figure 4:
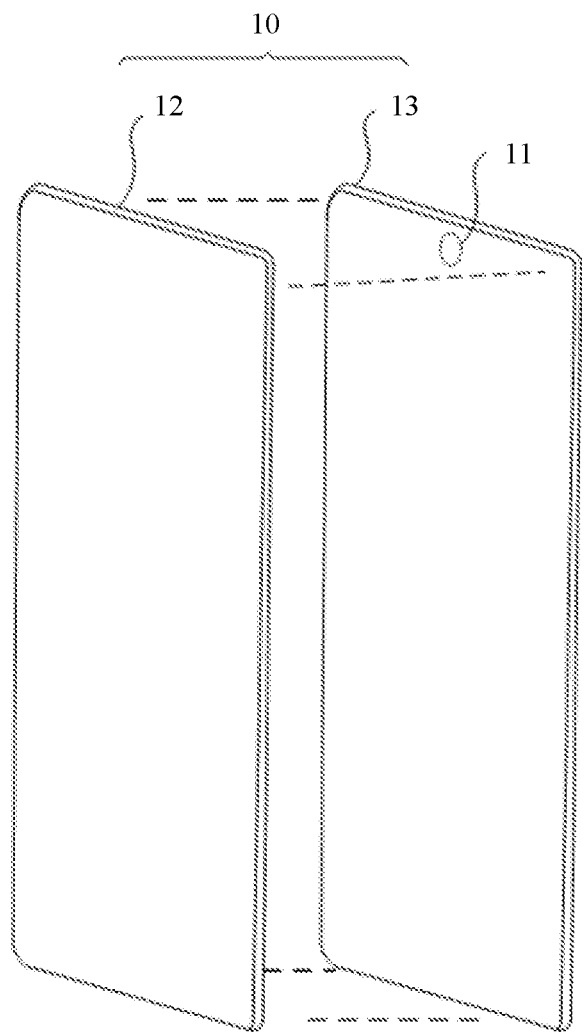
FIG. 4 is a schematic split structural diagram of a transparent protection cover and a display module in a display screen of an electronic device according to an embodiment of this application.

In this embodiment of this application, referring to FIG. 3, to implement photographing of the front-facing camera 20, a hole 11 that matches a lens assembly 21 of the front-facing camera 20 is disposed on the display screen 10. In this way, external light can enter the front-facing camera 20 to implement photographing. It should be understood that, as shown in FIG. 4, the display screen 10 may include a transparent protection cover 12 and a display module 13. The transparent protection cover 12 may be, for example, a glass cover or a sapphire cover. When the hole 11 is provided on the display screen 10, the hole 11 may be provided on the display module 13 of the display screen 10.

Figure 5:
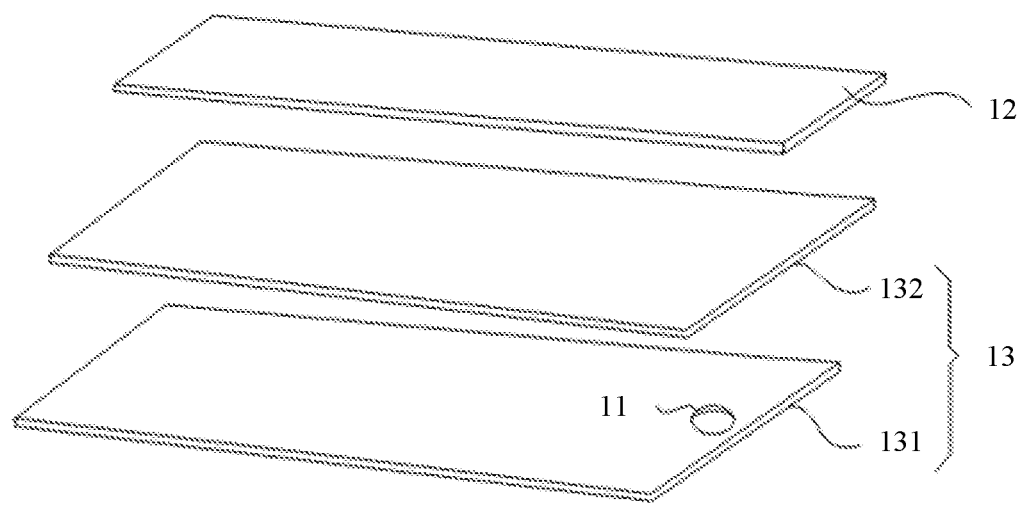
FIG. 5 is a schematic split structural diagram of a transparent protection cover, a liquid crystal panel, and a backlight element in a display screen of an electronic device according to an embodiment of this application.

In this embodiment of this application, the display module 13 may be an OLED display module, or the display module 13 may be a liquid crystal display module. When the display module 13 is a liquid crystal display module, as shown in FIG. 5, the liquid crystal display module may include a liquid crystal panel 132 and a backlight element 131. The backlight element 131 is disposed below the liquid crystal panel 132, and is configured to provide a backlight source for the liquid crystal panel 132.

When the hole 11 is provided on the liquid crystal display module, the hole 11 may be a through hole or a blind hole. For example, as shown in FIG. 4, the hole 11 may be provided on the backlight element 131, and no hole is provided on the liquid crystal panel 132. In this way, the hole 11 formed on the liquid crystal display module is a blind hole. Alternatively, in another example, holes 11 are provided on both the liquid crystal panel 132 and the backlight element 131. In this way, the hole 11 formed on the liquid crystal display module is a through hole. A size of the hole 11 is set according to a size of the lens assembly 21 of the front-facing camera 20.

Generally, the display screen 10 may further include a touch panel (TP), and the touch panel (not shown) may be disposed between the display module 13 and the transparent protection cover 12 (that is, TP on cell). Alternatively, the touch panel may be disposed at a film layer (namely, TP in cell) of the display module 13, the display module 13 is configured to output display content to a user, and the touch panel is configured to receive a touch event entered by the user on the display screen 10.

Figure 6:
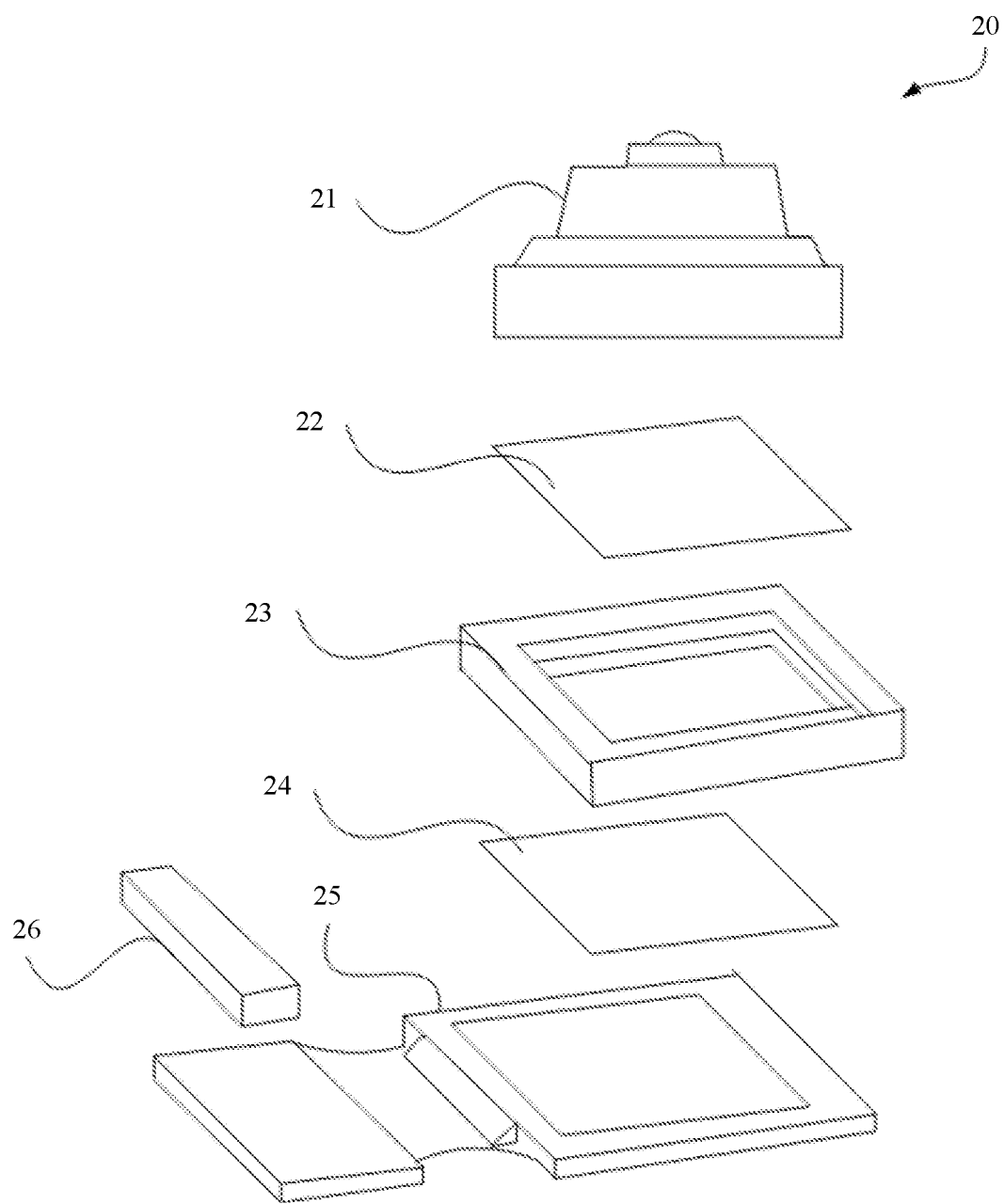
FIG. 6 is a schematic exploded structural diagram of a front-facing camera in an electronic device according to an embodiment of this application.

In an embodiment of this application, referring to FIG. 6, the front-facing camera 20 may include a lens assembly 21, a light filter 22, a holder 23, a photosensitive element 24, a flexible printed circuit 25 (FPC), and a connector 26. The lens assembly 21 is connected to one end of the holder 23. The other end of the holder 23 is fastened to one end of the flexible printed circuit 25. The connector 26 is fastened to the other end of the flexible printed circuit 25. The connector 26 electrically connects the flexible printed circuit 25 to the circuit board 40. The holder 23 and a bottom of the lens assembly 21 may be connected through welding, clamping, bonding, or threaded connection. The holder 23 is fixedly connected to the flexible circuit board 40 in an adhesive manner, in a clamping manner, or in a welding manner. A material of the holder 23 may be a plastic material or a metal material. It should be noted that the front-facing camera 20 shown in FIG. 5 is a camera with a fixed focal length. When the front-facing camera 20 is a camera with a variable focal length, the front-facing camera 20 may further include a focus module (not shown). The focus module is, for example, a focus motor. The focus motor may be disposed on the holder 23.

The light filter 22 may be located between the lens assembly 21 and the holder 23. For example, the light filter 22 may be disposed in a hollow-out region of the holder 23, the photosensitive element 24 is disposed on one end of the flexible printed circuit 25, the photosensitive element 24 is electrically connected to the flexible printed circuit 25, and the holder 23 is provided around an outer edge of the photosensitive element 24.

In this embodiment of this application, the light filter 22 may be an infrared cut filter (IRCF). The light filter 22 may filter out infrared light, to prevent the infrared light from entering the lens assembly 21 and affecting imaging.

The photosensitive element 24 may be a charge coupled device (CCD) or a complementary metal-oxide-semiconductor (CMOS) phototransistor. The connector 26 is configured to electrically connect the flexible printed circuit 25 to an image signal processing unit (ISP) on the circuit board 40, and electrically connect the image signal processing unit (ISP) to a digital signal processing unit (DSP). The image signal processing unit (ISP) and the digital signal processing unit (DSP) may be separately disposed on the circuit board 40; or the image signal processing unit (ISP) and the digital signal processing unit (DSP) may be integrated together on the circuit board 40. For example, during photographing, a shutter is opened. Light is transmitted to the photosensitive element 24 through the light filter 22 by using the lens assembly 21. An optical signal is converted into an electrical signal. The photosensitive element 24 transmits, by using the flexible printed circuit 25 and the connector 26, the electrical signal to the ISP for processing. The ISP converts the electrical signal into a digital image signal. The ISP outputs the digital image signal to the DSP for processing. The DSP converts the digital image signal into an image signal in a standard format such as RGB or YUV.

Figure 7:
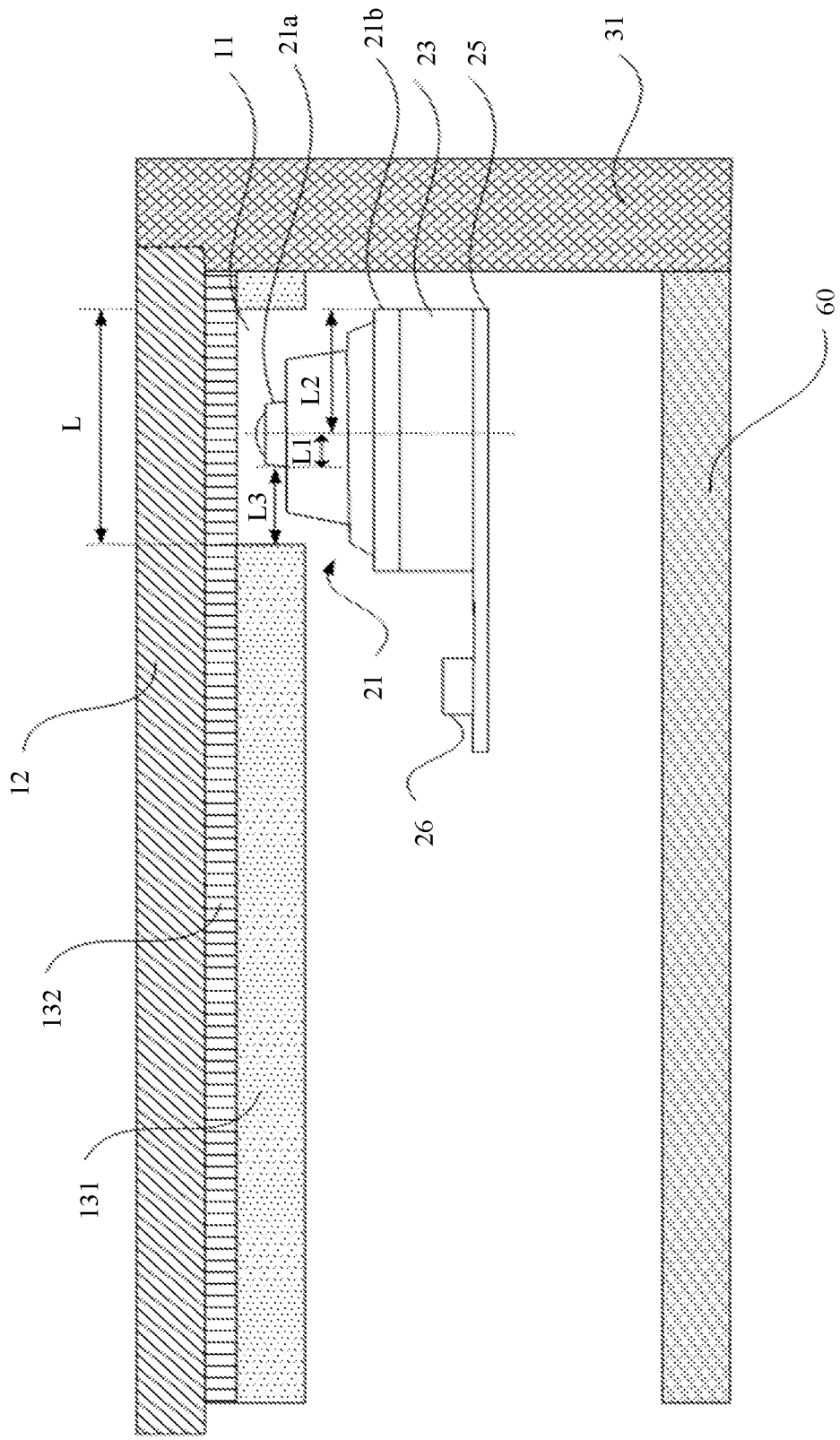
FIG. 7 is a schematic cross-sectional structural diagram of a part including: a front-facing camera, a display screen, a frame, and a rear cover in an electronic device according to an embodiment of this application.

In this embodiment of this application, when the front-facing camera 20 is disposed in the mobile phone 100, as shown in FIG. 7, a head 21*a* of the lens assembly 21 of the front-facing camera 20 may be located in the hole 11. A width of the hole 11 is L=L1+L2+L3. Herein, L1 is ½ of a width of the head 21*a* of the lens assembly 21, L2 is ½ of a width of a bottom 21*b* of the lens assembly 21, and L3 is a width of a gap reserved for deployment. Therefore, to reduce the width L of the hole 11, in this embodiment of this application, the width of the head 21*a* of the lens assembly 21 is reduced. After the width of the head 21*a* of the lens assembly 21 is reduced, the width L of the hole 11 is reduced, so that an area of the hole 11 on the display screen 10 is reduced, thereby increasing a screen-to-body ratio. For a specific implementation, refer to the following description.

Figure 8:
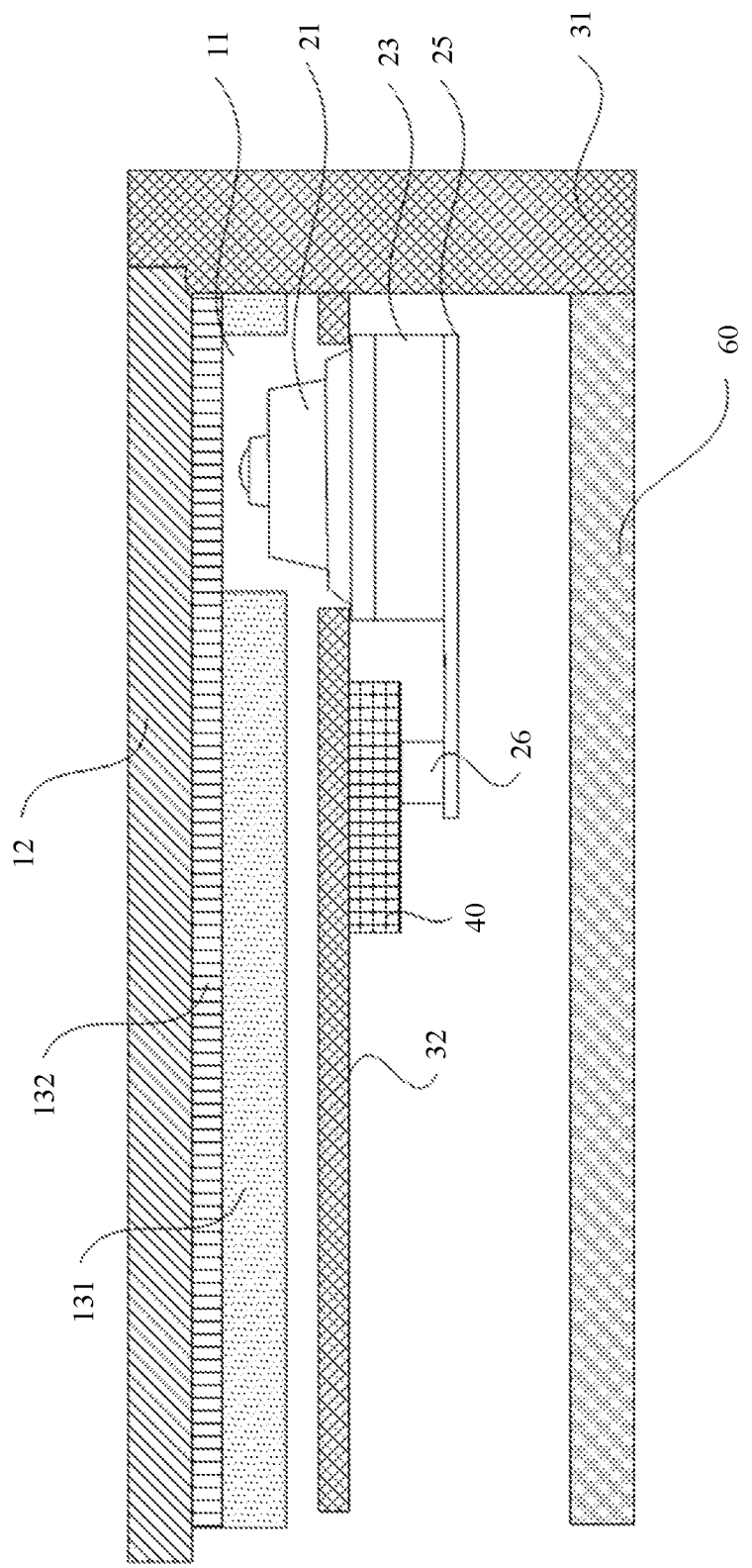
FIG. 8 is a schematic cross-sectional structural diagram of a part including: a front-facing camera, a display screen, a middle frame, and a rear cover in an electronic device according to an embodiment of this application.

In this embodiment of this application, as shown in FIG. 8, the front-facing camera 20 is disposed on the middle metal plate 32. One end of the front-facing camera 20 faces the hole 11 and extends into the hole 11, and the other end of the front-facing camera 20 is located on the surface that is of the middle metal plate 32 and that faces the rear cover 60. The circuit board 40 is fastened on the surface that is of the middle metal plate 32 and that faces the rear cover 60. The connector 26 of the front-facing camera 20 is electrically connected to the circuit board 40.

Figure 9:
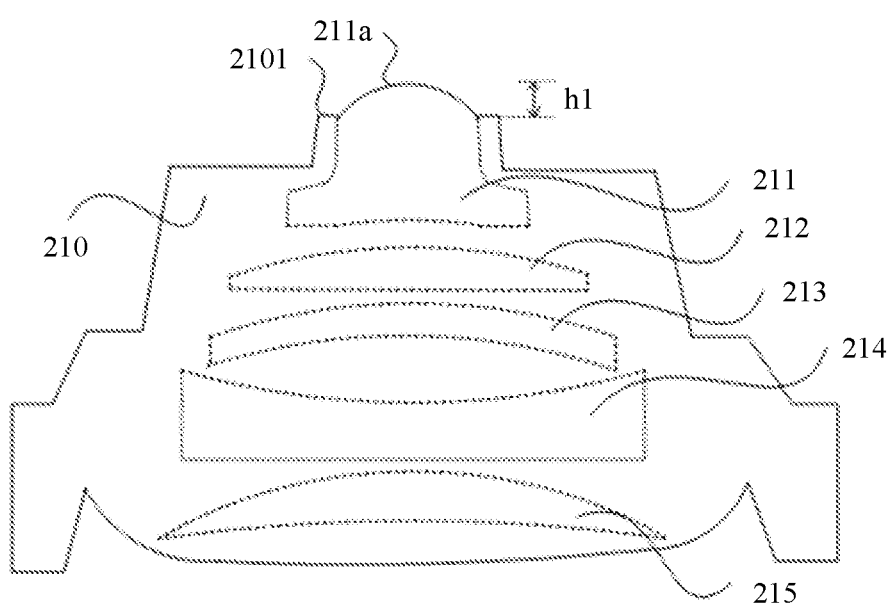
FIG. 9 is a schematic exploded structural diagram of a lens assembly in a front-facing camera in an electronic device according to an embodiment of this application.

In this embodiment of this application, as shown in FIG. 9, the lens assembly 21 may include a lens tube 210 and a lens group disposed in the lens tube 210. The lens group may include a plurality of lenses. For example, the lens group may include five or six lenses. In this embodiment of this application, a case in which the lens group includes five lenses is used as an example for description.

For example, as shown in FIG. 9, the lens group may sequentially include a first lens 211, a second lens 212, a third lens 213, a fourth lens 214, and a fifth lens 215 from an object side to an image side. For example, the first lens 211 is close to the object side, and the fifth lens 215 is close to the image side. The object side is a side of a photographed object, and the image side is an imaging side. Each lens may be a plastic lens, or may be a glass lens. Alternatively, some lenses in the lens group are plastic lenses, and some lenses may be glass lenses. A spacer (not shown) may be further disposed between some adjacent lenses to separate two adjacent lenses at a preset distance. A light shield may be disposed on an outer edge of each lens, or an outer edge of each lens is coated in black, to shield stray light in the lens tube 210.

Figure 10:
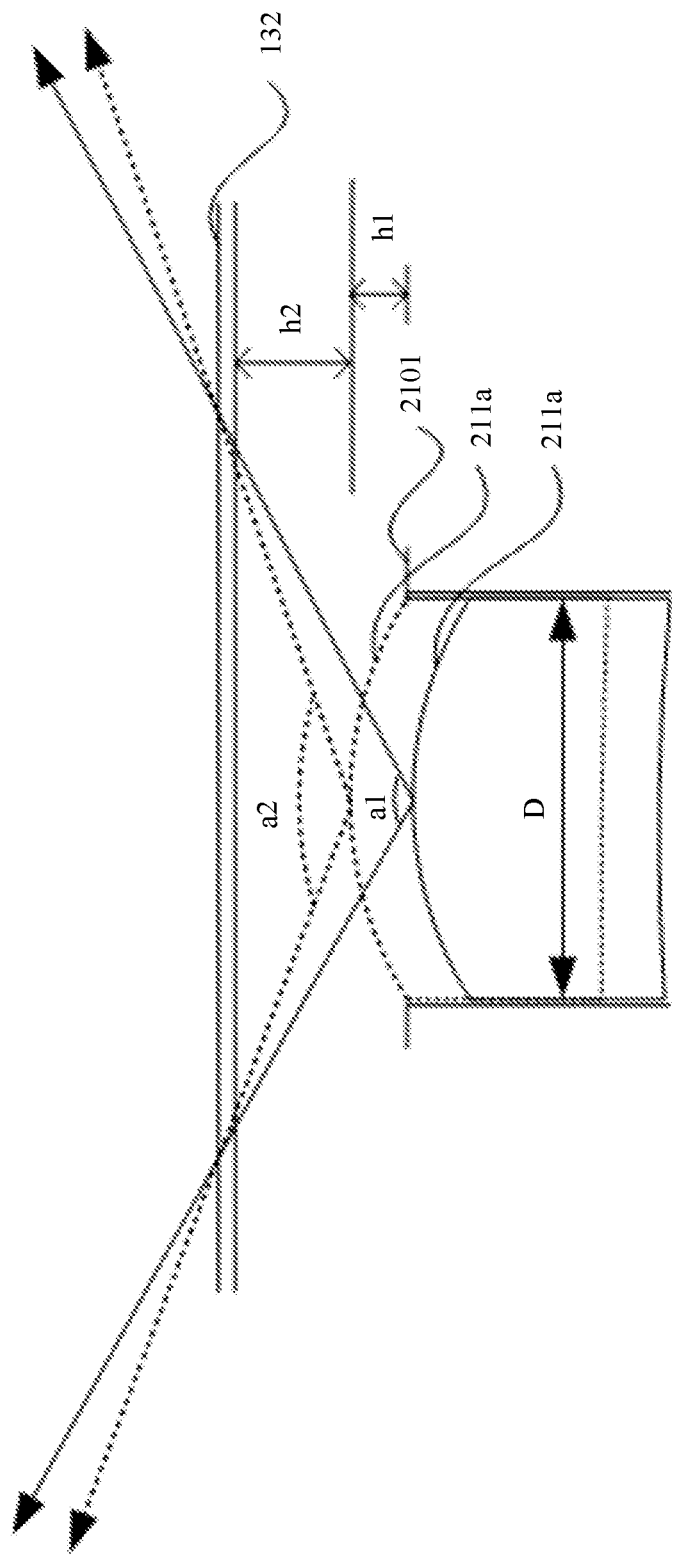
FIG. 10 is a schematic diagram of a structure between a first lens and a liquid crystal panel in a lens assembly.
Figure 11:
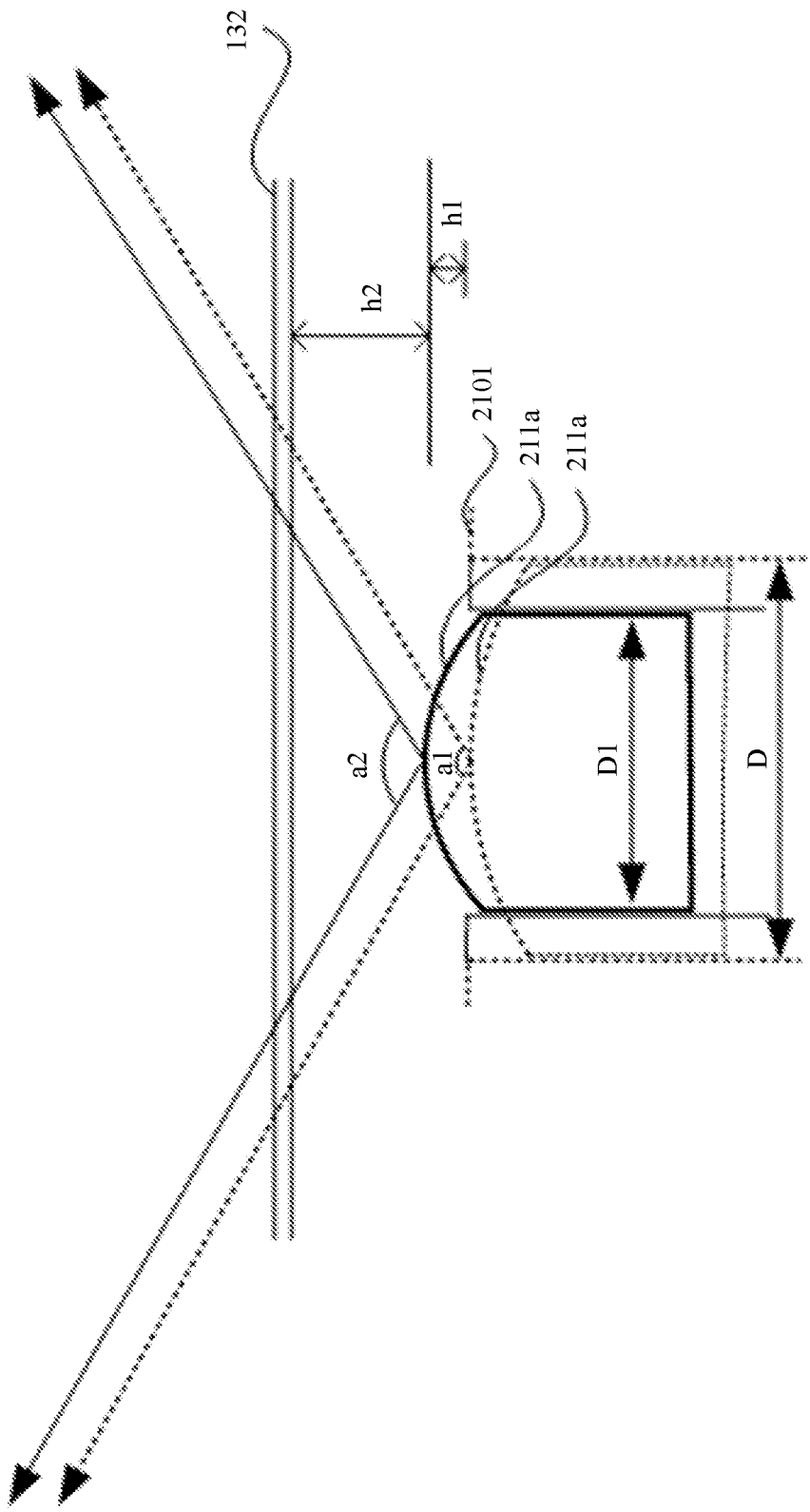
FIG. 11 is a schematic diagram of a structure between a first lens and a liquid crystal panel in a lens assembly according to an embodiment of this application.

In this embodiment of this application, to reduce a size of the head 21*a* of the lens assembly 21, as shown in FIG. 9, an end that is of the lens tube 210 and that faces the object side has a shoulder 2101, and a surface that is of the first lens 211 and that faces the object side is a convex surface 211*a*. The convex surface 211*a* protrudes from the shoulder 2101 of the lens tube 210. For example, the convex surface 211*a* of the first lens 211 protrudes from the lens tube 210 to the outside of the lens tube 210, and the convex surface 211a of the first lens 211 is exposed outside the lens tube 210. In this way, a distance h2 between the convex surface 211a of the first lens 211 and the liquid crystal panel 132 is reduced. When the distance h2 between the convex surface 211a of the first lens 211 and the liquid crystal panel 132 is reduced, as shown in FIG. 10, on the premise that the hole 11 remains unchanged, an angle a2 formed when the convex surface 211a of the first lens 211 protrudes from the shoulder 2101 of the lens tube 210 (which is shown by using a dashed line in FIG. 10) is greater than an angle a1 formed when the convex surface 211a of the first lens 211 does not protrude from the shoulder 2101 of the lens tube 210 (which is shown by using a solid line in FIG. 10). Therefore, after the convex surface 211a of the first lens 211 protrudes from the shoulder 2101 of the lens tube 210, the distance h2 between the convex surface 211a of the first lens 211 and the liquid crystal panel 132 is reduced, so that an angle formed between the convex surface 211a of the first lens 211 and the hole 11 is increased. However, in this embodiment of this application, when the convex surface 211a of the first lens 211 protrudes from the shoulder 2101 of the lens tube 210, an angle formed between the first lens 211 and the hole 11 remains unchanged, for example, a1=a2. In this case, as shown in FIG. 11, an effective diameter of the first lens 211 is reduced. For example, the effective diameter of the first lens 211 is reduced from D to D1. After the effective diameter of the first lens 211 is reduced, the size of the head 21a of the lens assembly 21 is reduced. When the size of the head 21a of the lens assembly 21 is reduced (that is, L1 in FIG. 7 is reduced), a width L (as shown in FIG. 7) of the hole 11 is reduced, so that the hole 11 is reduced. In this case, the angle a2 formed between the convex surface 211a of the first lens 211 and the hole 11 remains the same as the angle a1 formed when the convex surface 211a of the first lens 211 does not protrude from the shoulder 2101 of the lens tube 210. Therefore, in this embodiment of this application, the convex surface 211a of the first lens 211 protrudes from the shoulder 2101 of the lens tube 210, and the head 21a of the lens assembly 21 can be reduced without affecting a maximum field of view of the lens assembly 21, so that the head 21a of the lens assembly 21 tends to be miniaturized, thereby reducing the size of the hole 11 on the display screen and increasing a screen-to-body ratio of the display screen.

In a possible implementation, in this embodiment of this application, a maximum protruding distance h1 between the convex surface 211a of the first lens 211 and the shoulder 2101 of the lens tube 210 is greater than or equal to 0.3 mm. For example, the maximum distance h1 between the convex surface 211a of the first lens 211 and the shoulder 2101 of the lens tube 210 may be 0.3 mm, or the maximum distance h1 between the convex surface 211a of the first lens 211 and the shoulder 2101 of the lens tube 210 may be 0.4 mm.

Figure 12:
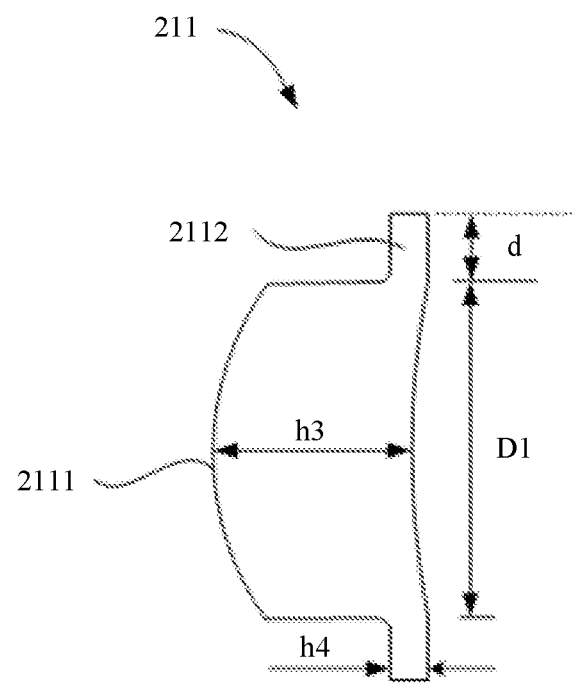
FIG. 12 is a schematic structural diagram of a first lens in a front-facing camera in an electronic device according to an embodiment of this application.

In a possible implementation, in this embodiment of this application, as shown in FIG. 12, the first lens 211 includes an effective diameter region 2111 and a non-effective diameter region 2112. The non-effective diameter region 2112 is around the effective diameter region 2111. The non-effective diameter region 2112 leans against the lens tube 210 and an adjacent second lens 212 or a light shield when the first lens 211 is assembled in the lens tube 210. In some examples, the non-effective diameter region may be coated in black to prevent stray light from affecting imaging.

In this embodiment of this application, in order that the convex surface 211a of the first lens 211 protrudes from the shoulder 2101 of the lens tube 210, a thickness of the effective diameter region 2111 of the first lens 211 is increased. Therefore, in this embodiment of this application, a ratio of a center thickness h3 of the effective diameter region 2111 of the first lens 211 to a thickness h4 of the non-effective diameter region 2112 of the first lens 211 is 2.5-3.5. For example, the ratio of the center thickness h3 of the effective diameter region 2111 of the first lens 211 to the thickness h4 of the non-effective diameter region 2112 may be 3, or the ratio of the center thickness h3 of the effective diameter region 2111 of the first lens 211 to the thickness h4 of the non-effective diameter region 2112 may be 3.3. In this way, it can be ensured that the convex surface 211a of the first lens 211 can protrude from the shoulder 2101 of the lens tube 210.

In a possible implementation, in this embodiment of this application, a ratio of an effective diameter (that is, a diameter of the effective diameter region 2111) D1 of the first lens 211 to the center thickness h3 of the effective diameter region 2111 of the first lens 211 is greater than 3. For example, the ratio of the effective diameter D1 of the first lens 211 to the center thickness h3 of the effective diameter region 2111 of the first lens 211 may be 3.5, or the ratio of the effective diameter D1 of the first lens 211 to the center thickness h3 of the effective diameter region 2111 of the first lens 211 may be 4. In this way, after the center thickness h3 of the effective diameter region 2111 of the first lens 211 is determined, the effective diameter D1 of the first lens 211 may be obtained. In this embodiment of this application, a width d of the non-effective diameter region 2112 of the first lens 211 only needs to meet that the first lens 211 is supported in the lens tube 210. For example, the width d of the non-effective diameter region 2112 of the first lens 211 may be 0.2 mm-0.5 mm. For example, the width d of the non-effective diameter region 2112 of the first lens 211 may be 0.25 mm, or the width d of the non-effective diameter region 2112 of the first lens 211 may be 0.4 mm.

Figure 1:
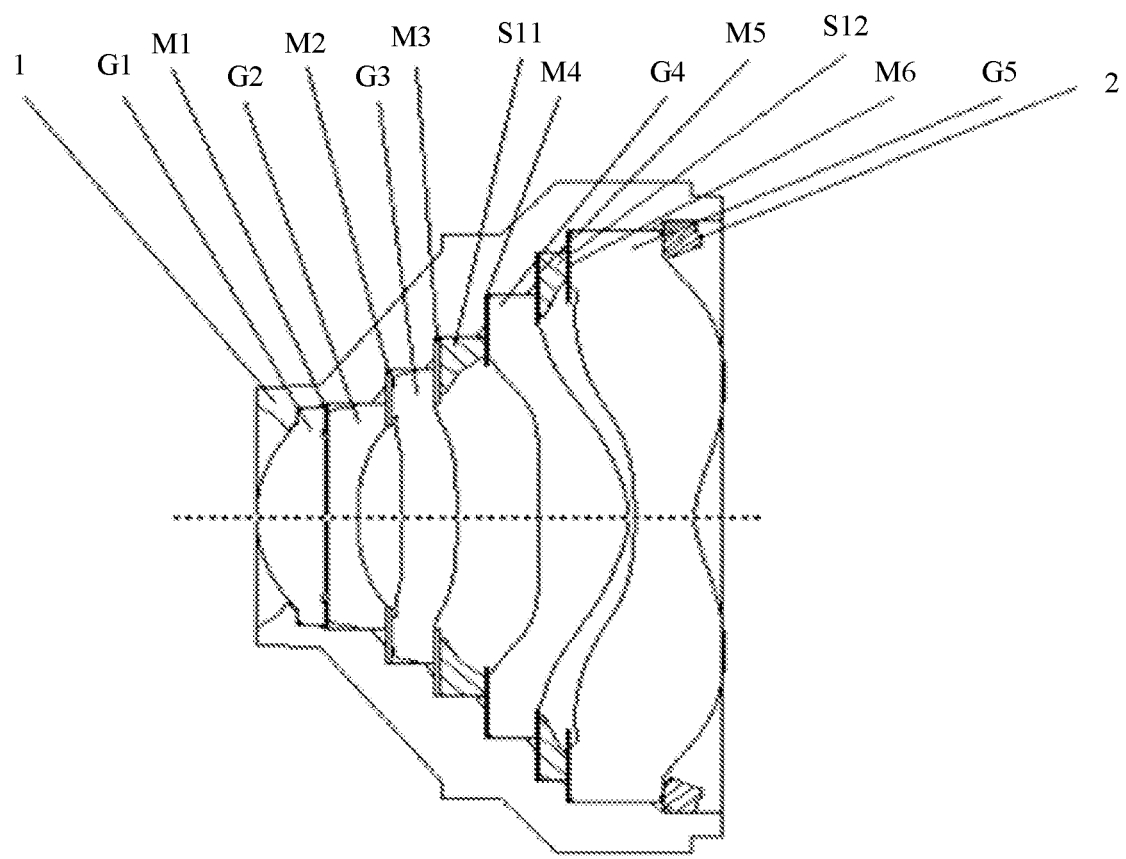
FIG. 1 is a schematic cross-sectional structural diagram of an existing lens assembly.
Figure 13:
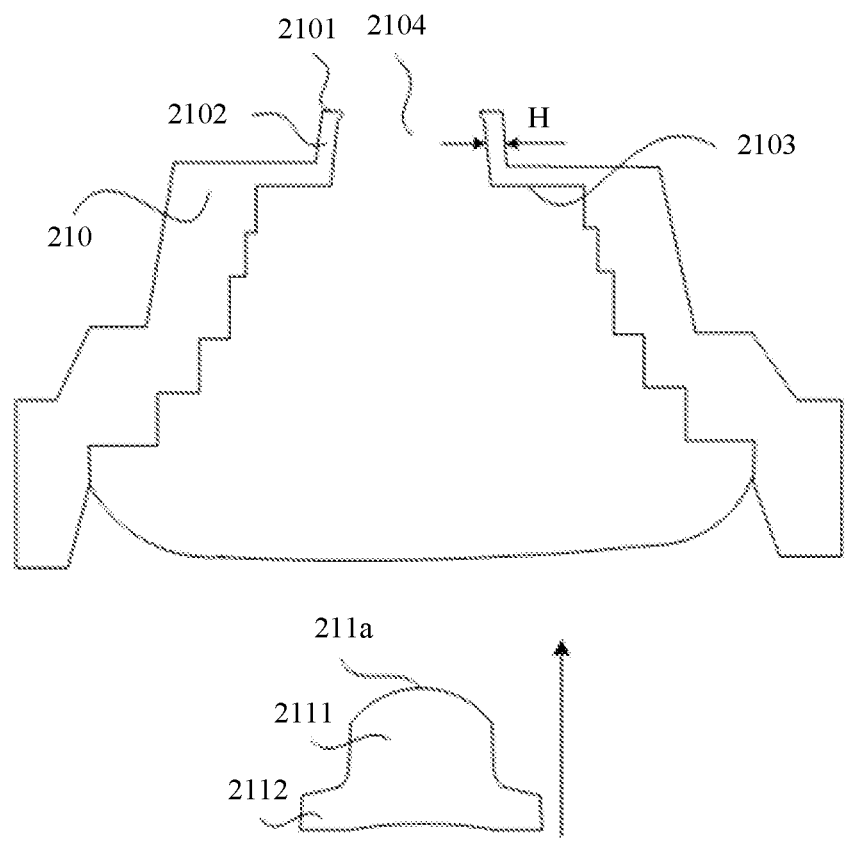
FIG. 13 is a schematic diagram of deployment of a lens tube and a first lens in a front-facing camera in an electronic device according to an embodiment of this application.

In a possible implementation, as shown in FIG. 13, a plurality of support parts (for example, a step-shaped structure in the lens tube 210) that can be used to support various lenses are disposed on an inner wall of the lens tube 210. In this embodiment of this application, during deployment, because the convex surface 211a of the first lens 211 protrudes from the shoulder 2101 of the lens tube 210, the effective diameter region 2111 of the first lens 211 is located in a hole 2104 enclosed by a top 2102 of the lens tube 210. To implement support of the first lens 211, a first support part 2103 is formed close to the top 2102 on the inner wall of the lens tube 210. In this way, when the first lens 211 is deployed, the non-effective diameter region 2112 of the first lens 211 may be supported at the first support part 2103, and the effective diameter region 2111 of the first lens 211 is located in the hole 2104. When the first support part 2103 is disposed close to the top 2102 on the inner wall of the lens tube 210, the following case is avoided: The support part is formed at the top 2102 on the inner wall of the lens tube 210. The first lens in FIG. 1 is supported at the top on the inner wall of the lens tube (with reference to FIG. 1). Therefore, a top wall thickness of the lens tube in FIG. 1 is relatively large. In comparison with FIG. 1, in this embodiment of this application, because the first support part 2103 does not need to be formed at the top 2102 on the inner wall of the lens tube 210, the wall thickness H of the top 2102 of the lens tube 210 may be reduced. For example, in this embodiment of this application, the wall thickness H of the top 2102 of the lens tube 210 may be 0.1 mm-0.25 mm. For example, the wall thickness H of the top 2102 of the lens tube 210 may be 0.15 mm, or the wall thickness H of the top 2102 of the lens tube 210 may be 0.20 mm. Therefore, in this embodiment of this application, the wall thickness H of the top 2102 of the lens tube 210 may be reduced to 0.1 mm, so that the size of the head 21a of the lens assembly 21 is smaller and the hole 11 on the display screen can be further reduced.

In some other embodiments, the wall thickness H of the top 2102 of the lens tube 210 is reduced to 0.1 mm. To enhance strength of the top 2102 of the lens tube 210, when the lens tube 210 is made of a resin material, a glass fiber may be added to the resin material. Strength of the lens tube 210 is increased by using the glass fiber, to avoid damage to the top 2102 of the lens tube 210 when the head 21a of the lens assembly 21 is squeezed, thereby ensuring reliability of the head 21a of the lens assembly 21.

Figure 14:
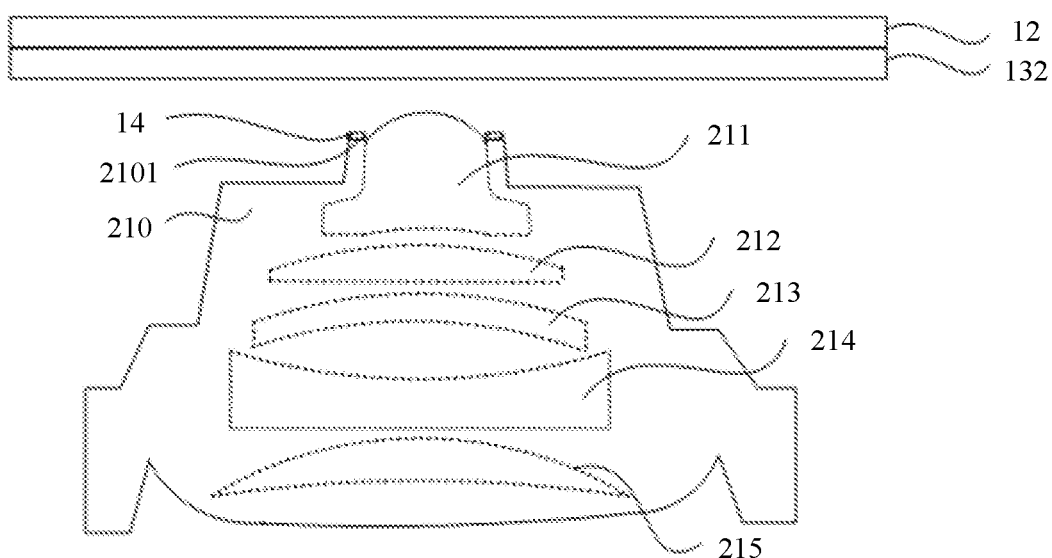
FIG. 14 is a schematic diagram of a front-facing camera, a liquid crystal panel, and a transparent protection cover in an electronic device according to an embodiment of this application.

In a possible implementation, in this embodiment of this application, as shown in FIG. 14, a protection structure 14 is disposed on the shoulder 2101 of the first lens 211, and the protection structure 14 may extend to one end that is of the convex surface 211a and that is close to the shoulder 2101. The protection structure 14 may protect the outer edge of the convex surface 211a of the first lens 211. In addition, the protection structure 14 may implement blackening (for example, coating, in black, an inner side surface of the protection structure 14 and a side surface facing the display screen), delustering, or sandblasting processing to block stray light. Therefore, in this embodiment of this application, the protection structure 14 may also be used to decorate the shoulder 2101 of the lens tube 210, so that the shoulder 2101 of the lens tube 210 is darker in appearance.

In a possible implementation, in this embodiment of this application, the convex surface 211a of the first lens 211 and the surface that is of the first lens 211 and that faces the image space may be aspheric surfaces; and two surfaces that are of each of the second lens 212, the third lens 213, the fourth lens 214, and the fifth lens 215 and that respectively face the image space and the object space may be both aspheric surfaces. An aspheric surface of each lens may be designed according to the following curve equation:

$$z = \frac{cr^2}{1 + \sqrt{1 - (1+k)c^2 r^2}} + \sum_{i=1}^{N} \alpha_i \rho^{2i}$$

Herein, z is a relative distance between a point that is on the aspheric surface and that is at a distance of r to an optical axis, and a tangent plane to the optical axis of the aspheric surface at an intersection point; r is a vertical distance between a point on an aspheric curve and the optical axis; c is curvature; k is a conical surface coefficient; $a_i$ is an $i^{th}$ order of aspheric coefficient; and $\rho^{2i}$ is each order of spherical coordinates.

In a possible implementation, the first lens 211 is made of a resin material, and a melt flow rate (MFR) of the resin material is greater than 20 g/10 min. In this way, a modeling filling rate of a lens with a relatively large ratio of a center thickness to an edge thickness can be improved, thereby ensuring optical quality of the first lens 211 and increasing imaging definition of a camera with a very small head 21a.

Figure 15:
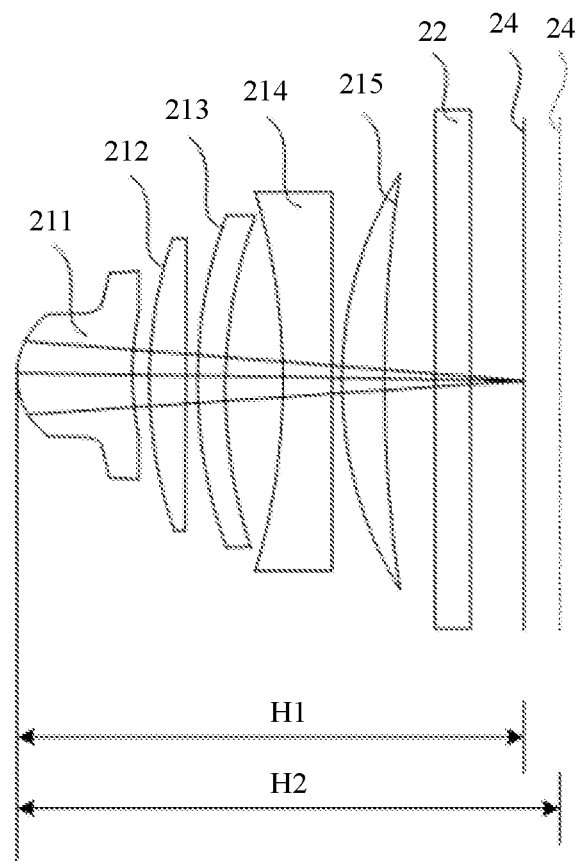
FIG. 15 is a schematic structural diagram of a lens group, a light filter, and a photosensitive element 24 in a front-facing camera in an electronic device according to an embodiment of this application.

In a possible implementation, to reduce a height of the front-facing camera, for example, a distance (that is, TTL) between a surface that is of the first lens 211 and that faces the object side and an imaging surface of the photosensitive element 24 may be reduced on an optical axis. Therefore, in this embodiment of this application, the first lens 211, the second lens 212, the third lens 213, the fourth lens 214, and the fifth lens 215 are plastic lenses made of the resin material. The first lens 211 has a positive focal power, and the fourth lens 214 has a negative focal power. Refractive indexes of the first lens 211 and the fourth lens 214 are greater than 1.6, and refractive indexes of the second lens 212, the third lens 213, and the fifth lens 215 are less than 1.55. For example, the refractive indexes of the first lens 211, the second lens 212, the third lens 213, the fourth lens 214, and the fifth lens 215 may be respectively 1.6688, 1.535, 1.5443, 1.66, and 1.535. In this way, a beam bending capability of the lens group can be improved. It is found through testing that, as shown in FIG. 15, an imaging position changes as the photosensitive element 24 indicated by using a dashed line in FIG. 15 is moved to the photosensitive element 24 indicated by using a solid line, and a distance between the surface that is of the first lens 211 and that faces the object side and the imaging surface of the photosensitive element 24 is reduced from H2 to H1 on the optical axis and is shortened by 0.2 mm (that is, H2−H1=0.2 mm). Therefore, in this embodiment of this application, a distance between the first lens 211 and the photosensitive element 24 is shortened, and the height of the front-facing camera deployed in this way is reduced. When the front-facing camera is applied to the electronic device, a thickness of the electronic device may be reduced.

In this embodiment of this application, to eliminate comprehensive chromatic aberration, dispersion coefficients of the first lens 211 and the fourth lens 214 are less than 30, and dispersion coefficients of the second lens 212, the third lens 213, and the fifth lens 215 are greater than 40. For example, the dispersion coefficients of the first lens 211, the second lens 212, the third lens 213, the fourth lens 214, and the fifth lens 215 may be respectively 19.51, 55.764, 55.865, 20.402, and 55.764. In this embodiment of this application, an achromatic condition for the first lens 211, the second lens 212, the third lens 213, the fourth lens 214, and the fifth lens 215 is as follows:

$$\sum_{i=1}^{N} h_i^2 \cdot \frac{\phi_i}{Vd_i} = 0$$

Herein, $h_i$ is a height of parallel incident light in a lens, $Vd_i$ is a dispersion coefficient, and $\varnothing_i$ is a focal power. Therefore, in this embodiment of this application, a focal power of each lens is allocated based on a refractive index and a dispersion coefficient to meet $\Sigma \phi_i h_i^2 / Vd_i$=min. During allocation, focal power proportions of the first lens 211 and the fourth lens 214 are increased. In this way, a light beam bending capability of the lens group can be improved, a height of the camera can be shortened, and comprehensive chromatic aberration can be eliminated. Therefore, lateral chromatic aberration (LCA) is less than 1 μm, and longitudinal chromatic aberration (LoCA) is less than 5 μm.

In some other examples, the foregoing lens assembly 21 may be further used as a lens assembly of the rear-facing camera. For example, the electronic device may further include the rear-facing camera. The rear-facing camera may include the lens assembly 21, the holder 24, the photosensitive element 25, and the flexible printed circuit 26 in the foregoing. The rear-facing camera may be disposed on a surface that is of the middle metal plate 32 and that faces the rear cover 60. The lens assembly 21 of the rear-facing camera faces the rear cover 60. A hole is provided on the rear cover 60. A head of the lens assembly 21 is disposed in the hole provided on the rear cover 60. In this embodiment of this application, the size of the head of the lens assembly 21 is reduced, so that the hole provided on the rear cover 60 is reduced. Therefore, an appearance of the rear cover 60 is more elegant, and strength of the rear cover 60 is better.

Scenario 2

In this embodiment of this application, in the lens group, the first lens 211 is a glass lens, and the second lens 212, the third lens 213, the fourth lens 214, and the fifth lens 215 are plastic lenses made of the resin material. The first lens 211 has a positive focal power, and the fourth lens 214 has a negative focal power. Refractive indexes of the first lens 211 and the fourth lens 214 are greater than 1.6, and refractive indexes of the second lens 212, the third lens 213, and the fifth lens 215 are less than 1.55. For example, the refractive indexes of the first lens 211, the second lens 212, the third lens 213, the fourth lens 214, and the fifth lens 215 may be respectively 1.7147, 1.535, 1.5446, 1.66, and 1.535. In this way, a light beam bending capability of the lens group can be improved. It is found through testing that the distance between the surface that is of the first lens 211 and that faces the object side and the imaging surface of the photosensitive element 24 is shortened by 0.2 mm on the optical axis. Therefore, in this embodiment of this application, the first lens 211 uses a glass lens with a high refractive index, and the fourth lens 214 uses a plastic lens with a high refractive index. The first lens 211 has a positive focal power, and the fourth lens 214 has a negative focal power. A distance between the first lens 211 and the photosensitive element 24 is shortened. In this way, a height of a formed front-facing camera is reduced. When the camera is applied to an electronic device, a thickness of the electronic device may be reduced.

In this embodiment of this application, when the first lens 211 is a glass lens, two surfaces of the first lens 211 may be designed as spherical surfaces, thereby reducing processing difficulty and manufacturing costs of the glass lens. Certainly, when the first lens 211 is a glass lens, the glass lens may also be designed with an aspheric surface.

In this embodiment of this application, to eliminate comprehensive chromatic aberration, dispersion coefficients of the first lens 211 and the fourth lens 214 are less than 30, and dispersion coefficients of the second lens 212, the third lens 213, and the fifth lens 215 are greater than 40. For example, the dispersion coefficients of the first lens 211, the second lens 212, the third lens 213, the fourth lens 214, and the fifth lens 215 may be respectively 29.51, 55.764, 55.865, 20.402, and 55.764. In this embodiment of this application, an achromatic condition for the first lens 211, the second lens 212, the third lens 213, the fourth lens 214, and the fifth lens 215 is as follows:

$$\sum_{i=1}^{N} h_i^2 \cdot \frac{\phi_i}{Vd_i} = 0$$

Herein, $h_i$ is a height of parallel incident light in a lens, $Vd_i$ is a dispersion coefficient, and $\emptyset_i$ is a focal power. Therefore, in this embodiment of this application, a focal power of each lens is allocated based on a refractive index and a dispersion coefficient to meet $\Sigma\phi_i h_i^2/Vd_i$=min. During allocation, focal power proportions of the first lens 211 and the fourth lens 214 are increased. In this way, a light beam bending capability of the lens group can be improved, a height of the camera can be shortened, and comprehensive chromatic aberration can be eliminated. Therefore, lateral chromatic aberration (LCA) is less than 1 μm, and longitudinal chromatic aberration (LoCA) is less than 5 μm.

Scenario 3

Figure 16:
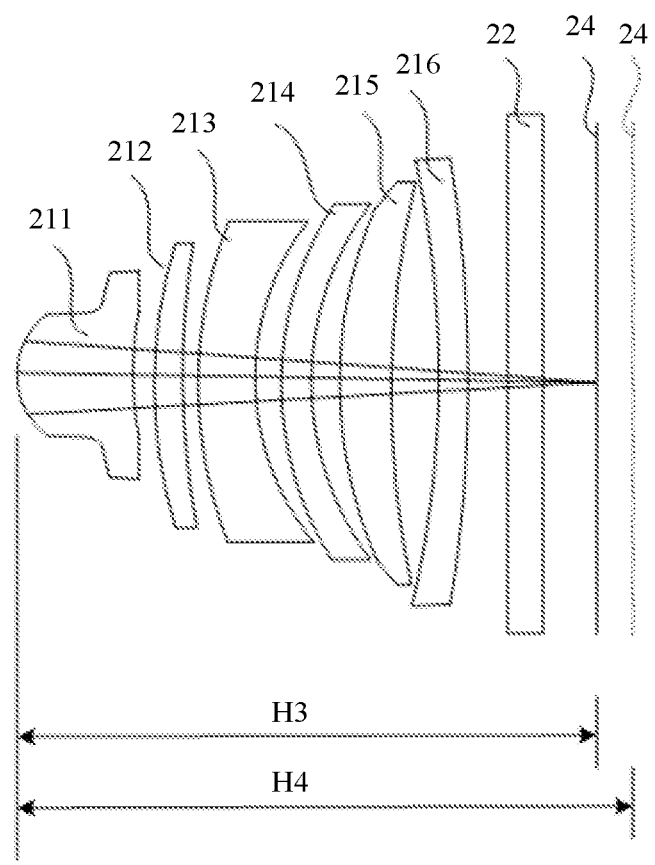
FIG. 16 is a schematic structural diagram of a lens group, a light filter, and a photosensitive element 24 in a front-facing camera in an electronic device according to an embodiment of this application.

In this embodiment of this application, as shown in FIG. 16, the lens group includes six lenses: a first lens 211, a second lens 212, a third lens 213, a fourth lens 214, a fifth lens 215, and a sixth lens 216. Surfaces that are of the sixth lens 216 and that respectively face the image side and the object side may be aspheric surfaces. The first lens 211, the second lens 212, the third lens 213, the fourth lens 214, the fifth lens 215, and the sixth lens 216 may be plastic lenses made of the resin material. Certainly, the first lens 211 may alternatively be a glass lens.

To reduce the height of the front-facing camera, in this embodiment of this application, refractive indexes of the first lens 211, the third lens 213, and the fifth lens 215 are greater than 1.6. The first lens 211 has a positive focal power, the third lens 213 has a negative focal power, and the fifth lens 215 has a positive focal power. Refractive indexes of the second lens 212, the fourth lens 214, and the sixth lens 216 are less than 1.55. For example, the refractive indexes of the first lens 211, the second lens 212, the third lens 213, the fourth lens 214, the fifth lens 215, and the sixth lens 216 may be respectively 1.6688, 1.535, 1.66, 1.5445, 1.66, and 1.535. In this way, a light beam bending capability of the lens group can be improved. It is found through testing that, as shown in FIG. 16, an imaging position changes as the photosensitive element 24 indicated by using a dashed line in FIG. 16 is moved to the photosensitive element 24 indicated by using a solid line, and a distance between the surface that is of the first lens 211 and that faces the object side and the imaging surface of the photosensitive element 24 is reduced from H4 to H3 on the optical axis and is shortened by 0.2 mm (that is, H4–H3=0.2 mm). Therefore, in this embodiment of this application, the first lens 211, the third lens 213, and the fifth lens 215 use plastic lenses with high refractive indexes. The first lens 211 has a positive focal power, the third lens 214 has a negative focal power, and the fifth lens 215 has a positive focal power. A distance between the first lens 211 and the photosensitive element 24 is shortened. In this way, a height of a formed front-facing camera is reduced. When the camera is applied to an electronic device, a thickness of the electronic device may be reduced.

In this embodiment of this application, to eliminate comprehensive chromatic aberration, dispersion coefficients of the first lens 211, the third lens 213, and the fifth lens 215 are less than 30, and dispersion coefficients of the second lens 212, the fourth lens 214, and the sixth lens 216 are greater than 40. For example, the dispersion coefficients of the first lens 211, the second lens 212, the third lens 213, the fourth lens 214, and the fifth lens 215 may be respectively 19.453, 55.764, 55.865, 20.402, and 55.764. In this embodiment of this application, an achromatic condition for the first lens 211, the second lens 212, the third lens 213, the fourth lens 214, the fifth lens 215, and the sixth lens 216 is as follows:

$$\sum_{i=1}^{N} h_i^2 \cdot \frac{\phi_i}{Vd_i} = 0$$

Herein, $h_i$ is a height of parallel incident light in a lens, $Vd_i$ is a dispersion coefficient, and $\emptyset_i$ is a focal power. Therefore, in this embodiment of this application, a focal power of each lens is allocated based on a refractive index and a dispersion coefficient to meet $\Sigma\phi_i h_i^2/Vd_i$=min. During allocation, focal power proportions of the first lens 211, the third lens 213, and the fifth lens 215 are increased. In this way, the light beam bending capability of the lens group can be improved, a height of the camera can be shortened, and comprehensive chromatic aberration can be eliminated. Therefore, lateral chromatic aberration (LCA) is less than 1 μm, and longitudinal chromatic aberration (LoCA) is less than 5 μm.

In the descriptions of the embodiments of this application, it should be noted that the terms "mounting" and "connection" should be understood in a broad sense unless otherwise expressly specified and limited, for example, may be a fixed connection, or may be an indirect connection by using an intermediate medium, or may be an internal connection of two elements, or may be an interaction relationship between two elements. For persons of ordinary skill in the art, specific meanings of the foregoing terms in the embodiments of this application may be understood based on a specific situation.

In the specification, claims, and accompanying drawings of embodiments of this application, the terms "first", "second", "third", "fourth", and so on (if existent) are intended to distinguish between similar objects but do not necessarily indicate a specific order or sequence.

Finally, it should be noted that the foregoing embodiments are merely intended to describe the technical solutions in the embodiments of this application other than limiting this application. Although the embodiments of this application are described in detail with reference to the foregoing embodiments, persons of ordinary skill in the art should understand that they may still make modifications to the technical solutions described in the foregoing embodiments or make equivalent replacements to some or all technical features thereof, and the essence of the corresponding technical solutions shall not depart from the scope of the technical solutions of the embodiments of this application.

What is claimed is:

1. An electronic device, comprising at least one camera, the camera having an object side and an image side and comprising:
   at least a lens assembly having a lens tube; and
   a lens group disposed in the lens tube,
   the lens group having a first lens closest to the object side, the first lens having an effective region and a non-effective region, the non-effective region being formed around an outer edge of the effective region,
   a ratio of a center thickness of the effective region to a thickness of the non-effective region is greater than or equal to 2.5 and less than or equal to 3.5,
   the lens tube having a first end that faces the object side, the first end of the lens tube having an opening, the effective region of the first lens being disposed within the opening of the first end of the lens tube, and
   the lens tube further comprising a first support part, the non-effective region of the first lens resting against the first support part of the lens tube, wherein the lens group further includes a second lens, a third lens, a fourth lens, a fifth lens, and a sixth lens disposed in sequence along the optical axis within the lens tube on a side of the first lens away from the object side, the effective region of the first lens has a convex surface protruding from the shoulder of the top portion of the lens tube,
   the first lens, the third lens and the fifth lens are plastic lenses with refractive indexes are greater than 1.6, and the second lens, the fourth lens, and the sixth lens are plastic lenses with refractive indexes less than 1.55,
   the first lens has a positive focal power, the third lens has a negative focal power, and the fifth lens has a positive focal power.

2. The electronic device of claim 1, wherein a ratio of a diameter of the effective region to the center thickness of the effective region of the first lens is greater than 3.

3. The electronic device of claim 1, wherein the first end of the lens tube has a top portion that encloses the opening, the top portion having a shoulder formed on an end surface of the top portion.

4. The electronic device of claim 3, wherein the first support part is formed on an inner wall of the lens tube close to the top portion.

5. The electronic device of claim 3, wherein the top portion has a side wall having a thickness greater than or equal to 0.1 mm and less than or equal to 0.25 mm.

6. The electronic device of claim 1, wherein the width of the non-effective region of the first lens is greater than or equal to 0.2 mm and less than or equal to 0.5 mm.

7. A lens assembly for a camera having an object side and an image side, the lens assembly comprising:
   a lens tube; and
   a lens group disposed in the lens tube,
   the lens group having a first lens closest to the object side, the first lens having an effective region and a non-effective region, the non-effective region being formed around an outer edge of the effective region,
   a ratio of a center thickness of the effective region to a thickness of the non-effective region is greater than or equal to 2.5 and less than or equal to 3.5,
   the lens tube having a first end that faces the object side, the first end of the lens tube having an opening, the effective region of the first lens being disposed within the opening of the first end of the lens tube, and
   the lens tube further comprising a first support part, the non-effective region of the first lens resting against the first support part of the lens tube, wherein the lens group further includes a second lens, a third lens, a fourth lens, a fifth lens, and a sixth lens disposed in sequence along the optical axis within the lens tube on a side of the first lens away from the object side, the effective region of the first lens has a convex surface protruding from the shoulder of the top portion of the lens tube,
   the first lens, the third lens and the fifth lens are plastic lenses with refractive indexes are greater than 1.6, and the second lens, the fourth lens, and the sixth lens are plastic lenses with refractive indexes less than 1.55,
   the first lens has a positive focal power, the third lens has a negative focal power, and the fifth lens has a positive focal power.

8. The lens assembly of claim 7, wherein a ratio of a diameter of the effective region to the center thickness of the effective region of the first lens is greater than 3.

9. The lens assembly of claim 7, wherein the first end of the lens tube has a top portion that encloses the opening, the top portion having a shoulder formed on an end surface of the top portion.

10. The lens assembly of claim 9, wherein the first support part is formed on an inner wall of the lens tube close to the top portion.

11. The lens assembly of claim 9, wherein the top portion has a side wall having a thickness greater than or equal to 0.1 mm and less than or equal to 0.25 mm.

12. The lens assembly of claim 7, wherein the width of the non-effective region of the first lens is greater than or equal to 0.2 mm and less than or equal to 0.5 mm.

* * * * *